US009842448B1

(12) United States Patent
Lickfelt

(10) Patent No.: US 9,842,448 B1
(45) Date of Patent: Dec. 12, 2017

(54) REAL-TIME VEHICLE FEATURE CUSTOMIZATION AT POINT OF ACCESS

(71) Applicant: HONDA MOTOR CO., LTD., Minato-ku, Tokyo (JP)

(72) Inventor: Brian K. Lickfelt, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/274,640

(22) Filed: Sep. 23, 2016

(51) Int. Cl.
*G07C 9/00* (2006.01)
*H04W 4/00* (2009.01)
*H04W 76/02* (2009.01)
*B60R 16/037* (2006.01)

(52) U.S. Cl.
CPC ........ *G07C 9/00896* (2013.01); *B60R 16/037* (2013.01); *H04W 4/008* (2013.01); *H04W 76/023* (2013.01); *G07C 2009/0019* (2013.01)

(58) Field of Classification Search
CPC .............. G07C 9/00158; G07C 5/008; G07C 9/00309; G07C 9/00126; G07C 5/00; G07C 5/0808; G07C 5/085; G07C 5/02; G07C 9/00896; G07C 2009/0019; B60R 16/037; H04W 4/008; H04W 76/023
See application file for complete search history.

(56) References Cited

U.S. PATENT DOCUMENTS

| | | | | |
|---|---|---|---|---|
| 6,429,773 B1 * | 8/2002 | Schuyler | ................ | B60R 25/04 340/425.5 |
| 6,696,983 B2 * | 2/2004 | Tang | .................... | B60R 25/102 340/425.5 |
| 7,050,795 B2 * | 5/2006 | Wiegand | ............... | B60R 16/037 455/419 |
| 7,349,722 B2 * | 3/2008 | Witkowski | ............ | G07C 5/008 455/41.2 |
| 8,159,324 B2 * | 4/2012 | Zellweger | .......... | G07C 9/00309 340/12.28 |
| 8,538,331 B2 | 9/2013 | Jung et al. | | |
| 8,538,408 B2 * | 9/2013 | Howarter | ........... | B60R 25/2009 455/420 |
| 8,751,065 B1 | 6/2014 | Kato | | |
| 8,866,604 B2 | 10/2014 | Rankin et al. | | |
| 9,147,296 B2 | 9/2015 | Ricci | | |
| 9,224,249 B2 | 12/2015 | Lowrey et al. | | |
| 9,248,794 B2 | 2/2016 | Chang et al. | | |
| 9,318,017 B2 * | 4/2016 | Witkowski | ............ | G08C 17/02 |
| 9,666,005 B2 * | 5/2017 | Ellis | .................. | G07C 9/00309 |

(Continued)

*Primary Examiner* — Brian Miller
(74) *Attorney, Agent, or Firm* — Arent Fox LLP

(57) ABSTRACT

Systems and methods for vehicle customization are disclosed. Customizing a vehicle configuration may include associating a wireless device of a user with the vehicle. The vehicle customization system may detect a first occurrence of an event corresponding to a set of customizable control options for the vehicle. The vehicle customization system may optionally respond to the first occurrence of the event based on a default option of the set of customizable control options. The vehicle customization system may send, to the wireless device, a notification of the event. The vehicle customization system may receive, from the wireless device, a selected control option of the set of customizable control options corresponding to the event. The vehicle customization system may respond to a second occurrence of the event based on the selected control option.

20 Claims, 7 Drawing Sheets

(56) References Cited

U.S. PATENT DOCUMENTS

| | | | |
|---|---|---|---|
| 9,666,040 B2* | 5/2017 | Flaherty | G08B 6/00 |
| 2002/0096572 A1* | 7/2002 | Chene | B60H 1/00642 |
| | | | 236/62 |
| 2002/0107010 A1* | 8/2002 | Witte | B60R 25/2081 |
| | | | 455/418 |
| 2002/0109587 A1* | 8/2002 | Attring | B60R 25/1004 |
| | | | 340/426.1 |
| 2003/0078709 A1* | 4/2003 | Yester | B60R 16/037 |
| | | | 701/36 |
| 2005/0134477 A1* | 6/2005 | Ghabra | B60R 25/246 |
| | | | 340/13.24 |
| 2005/0261815 A1* | 11/2005 | Cowelchuk | B60R 16/037 |
| | | | 701/36 |
| 2013/0211623 A1* | 8/2013 | Thompson | G07C 5/008 |
| | | | 701/2 |
| 2014/0163771 A1 | 6/2014 | Demeniuk | |
| 2014/0253050 A1* | 9/2014 | Whitaker | G01M 17/00 |
| | | | 320/162 |
| 2014/0309861 A1 | 10/2014 | Lind et al. | |
| 2014/0380240 A1* | 12/2014 | Rankin | G06F 3/048 |
| | | | 715/810 |
| 2015/0038090 A1 | 2/2015 | Chang | |
| 2015/0081175 A1* | 3/2015 | Fear | H04W 4/008 |
| | | | 701/49 |
| 2015/0127215 A1* | 5/2015 | Chatterjee | H04W 4/001 |
| | | | 701/36 |
| 2015/0362997 A1* | 12/2015 | Hatton | G06F 3/017 |
| | | | 701/2 |

\* cited by examiner

REAL-TIME VEHICLE FEATURE CUSTOMIZATION AT POINT OF ACCESS

BACKGROUND

Modern vehicles include many customizable options for the driver and/or passengers. For example, the vehicle may perform different responses to activation of a control based on the preferences of the driver. Typically this customization exists only in the vehicle display device (e.g., monitor or center stack). Some vehicle manufacturers also offer customization utilizing a mobile phone (interchangeably referred to herein as "cellular" or "cell" phone) or web application. Other customization may be available by a dealer, e.g., via a service tool. Moreover it may also be possible for a user to trigger one or more inputs in a sequence to change the setting in a respective electronic control unit's (ECU) memory, without the need for any other interface method.

Existing methods and systems for customizing a vehicle may be confusing or frustrating for users. In particular, a user who is purchasing the vehicle from a dealer or even a previous owner may be unfamiliar with the customization system and the available options. When purchasing a vehicle, the user generally has little interest in spending additional time with the dealer to configure every customizable option. Further, because the user is generally unfamiliar with the vehicle, the user may not know which customization option to choose in advance. Customers purchasing new vehicles may complain about the operation of the vehicle and/or bring the vehicle back to the dealer in order to perform customization.

In view of the foregoing, improvements to vehicle customization systems and methods would be desirable. Further advantages will become apparent from aspects of the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect of the present disclosure, a method of customizing a vehicle configuration includes associating a wireless device of a user with the vehicle. The method also includes detecting a first occurrence of an event corresponding to a set of customizable control options for the vehicle. The method also includes sending, to the wireless device, a notification of the set of customizable control options. The method also includes receiving, from the wireless device, a selected control option of the set of customizable control options corresponding to the event. The method also includes responding to a second occurrence of the event based on the selected control option. The method may also optionally include responding to the first occurrence of the event based on a default option of the set of customizable control options.

According to another aspect of the disclosure, a customizable vehicle configuration system includes a plurality of vehicle controllers that are operable to control respective components of a vehicle. The customizable vehicle configuration system also includes a wireless communications interface, a memory; and a processor communicatively coupled to the wireless communications interface and the memory. The processor is configured to associate a wireless device of a user with the vehicle. The processor is configured to detect, from at least one of the vehicle controllers, a first occurrence of an event corresponding to a set of customizable control options for the vehicle. The processor is configured to send, to the wireless device via the wireless communications interface, a notification of the customizable control options. The processor is configured to receive, from the wireless device via the wireless communications interface, a selected control option of the set of customizable control options corresponding to the event. The processor is configured to respond to a second occurrence of the event based on the selected control option. The processor may optionally be configured to respond to the first occurrence of the event based on a default option of the set of customizable control options.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further aspects and advances thereof, will be best understood by reference to the following detailed description of illustrative aspects of the disclosure when read in conjunction with the accompanying drawings, wherein:

DETAILED DESCRIPTION

Figure 1:
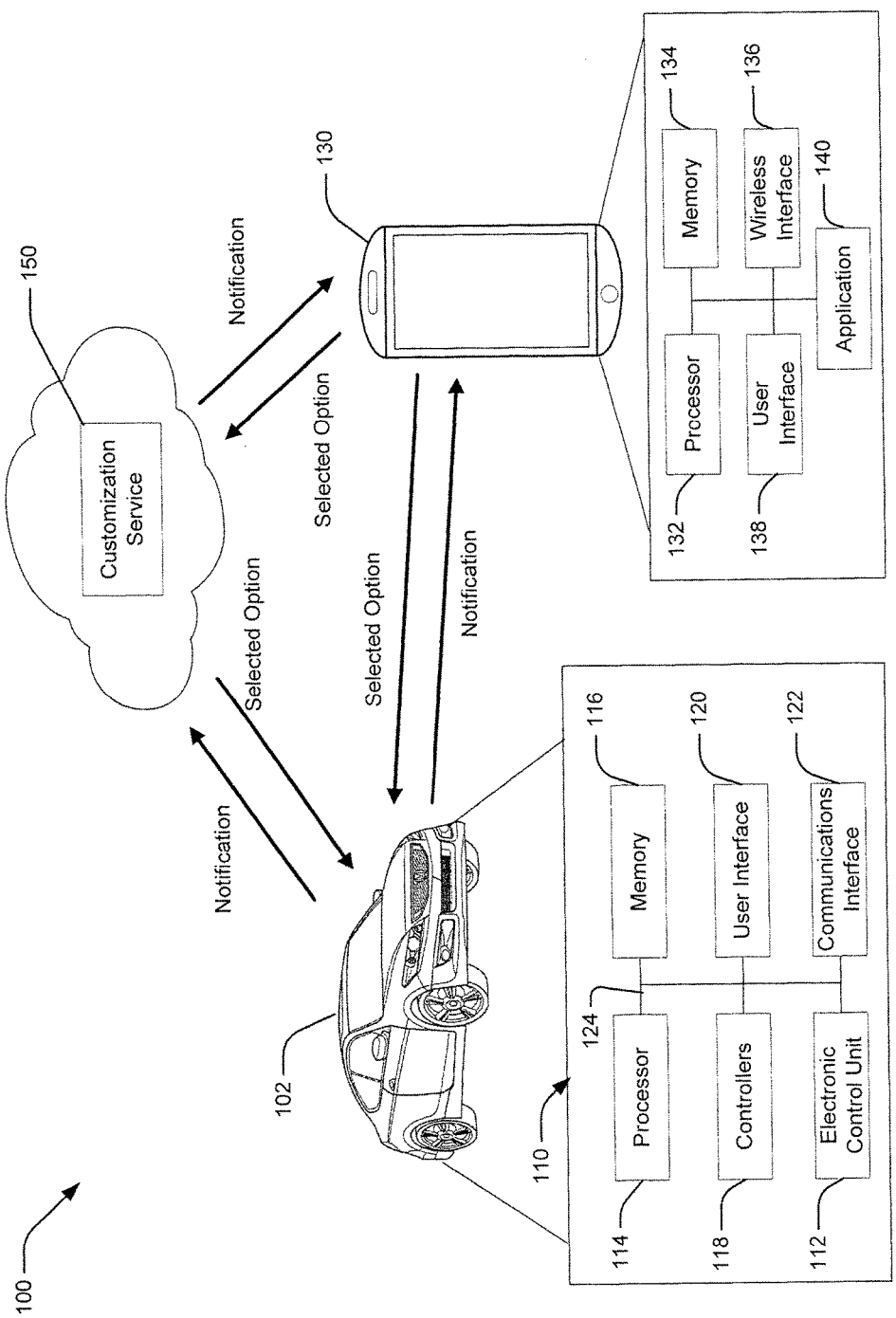
FIG. 1 illustrates a schematic view of an example operating environment of a vehicle customization system in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Generally described, aspects of the present disclosure provide for real-time vehicle feature customization at the point of access. That is, the user of a vehicle is able to customize vehicle features as the vehicle features are activated by the user. In an aspect, in response to the user activating a customizable feature, a vehicle customization feature sends a notification to a wireless device associated with the user and the vehicle. The notification informs the user of the available customization options. The user then selects a desired customization option using the wireless device. Thenceforth, the vehicle uses the selected customization option when activating the customizable feature.

The disclosed customization system and method may allow a new user of the vehicle to conveniently and gradually customize the vehicle as the user becomes familiar with the vehicle features. Instead of having to navigate through manuals or menus and attempt to understand verbal descriptions of the features, the user may associate the experience of activating the feature with the customization options for how the vehicle responds to the feature because the customization options are presented in close temporal proximity with the feature activation. Accordingly, the user is already familiar with both the feature activation and the current or default option when presented with the customization options. Additionally, there is no need to navigate a menu system to discover vehicle features.

Turning to FIG. 1, a schematic view of an example operating environment 100 of a vehicle customization system 110 and example methods according to an aspect of the disclosure is provided. The vehicle customization system 110 may reside within a vehicle 102. The vehicle 102 and/or vehicle customization system 110 may communicate with a wireless device 130 and/or a customization service 150. In an aspect, the wireless device 130 may include any device capable of wireless communication with the vehicle customization system 110 such as, but not limited to a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. In an aspect, the customization service 150 may be an online service that provides customization information. In an aspect, the customization service 150 may be a cloud service hosted by one or more computer servers or virtual servers. The components of the vehicle customization system 110, as well as the components of other systems (e.g., wireless device 130 and customization service 150), hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the vehicle customization system 110, among others, including vehicle HVAC systems, vehicle audio systems, vehicle video systems, vehicle infotainment systems, vehicle telephone systems, and the like. The various vehicle systems may be associated with one or more controllers 118 for controlling the vehicle systems. In some variations, the one or more controllers 118 control the vehicle systems via the ECU 112. The vehicle customization system 110 may also include a processor 114 and a memory 116 that communicate with the ECU 112, controllers 118, a user interface 120 and a communications interface 122 via a bus 124.

The ECU 112 may include internal processing memory, an interface circuit, and bus lines for transferring data, sending commands, and communicating with the vehicle systems. The ECU 112 may include an internal processor and memory, not shown. The vehicle 102 may also include the bus 124 for sending data internally among the various components of the vehicle customization system 110.

The controllers 118 may include any controls by which the user interacts with the vehicle 102. Example controllers include buttons, switches, knobs, dials, wheels, pedals, the steering wheel, and gear selector. The controllers may also include external devices such as remote entry buttons or key fobs, or a receiver for communication with such external devices. In an aspect, the controllers 118 are associated with a customizable feature. For example, a window control switch may be associated with a window control feature having customizable options for window opening speed and/or intermediate stop positions. As another example, a receiver for a remote entry key fob may be associated with a remote entry feature having customizable options for which doors are unlocked by the remote entry key fob.

The user interface 120 may include a system for receiving input and presenting output for the vehicle customization system 110. In an aspect, the user interface 120 may include a computer display (e.g., an LCD screen) and speakers for output and a touch input, buttons, dials, keyboard, or other features for input. The user interface 120 may be integrated with a vehicle infotainment system. For example, a user may select a menu option or press a dedicated button to access the vehicle customization system 110. The user interface 120 may allow the user to select customization options through a menu system without real-time interaction with the control features.

The communications interface 122 (e.g., wireless modem) may provide wired or wireless computer communications utilizing various protocols to send/receive electronic signals internally with respect to features and systems within the vehicle 102 and with respect to external devices (e.g., wireless device 130 and customization service 150). These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications interface 122 of the vehicle 102 may be operably connected for internal computer communication via a bus (e.g., a CAN or a LIN protocol bus) to facilitate data input and output between the ECU 112 and vehicle features and systems.

The wireless device 130 may include any device capable of wireless communication with the vehicle customization system 110. In an aspect, for example, the wireless device 130 may include a processor 132, a memory 134, a wireless interface 136, a user interface 138 and an application 140. The processor 132 may execute computer executable instructions stored in memory 134. For example, the application 140 may include a set of instructions stored in memory 134 that are executed by the processor 132. The wireless interface 136 may provide wireless computer communications utilizing various protocols to send/receive electronic signals with respect to external devices (e.g., vehicle 102 and customization service 150). These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a wireless local area network (WLAN), a wireless wide area network (WWAN) (e.g., cellular) and/or a point-to-point system. The user interface 138 may include a system for receiving input and presenting output for the wireless device 130. In an aspect, the user interface 138 may include a display (e.g., an LCD screen) and speakers for output and a touch input, buttons, dials, keyboard, or other features for input. For example, the wireless device 130 may be a smart phone including a touch screen for both input and output.

In an aspect, the application 140 may be a user installed application corresponding to the vehicle 102 or the customization service 150. For example, the manufacturer of the vehicle 102 or the provider of the customization service 150 may provide the application 140 to users of the vehicle 102 (e.g., through a digital distribution service). The application 140 may be stored in the memory 134 and executed by the processor 132. When the application 140 receives a notification of an event, the application 140 may display a set of customization options corresponding to the event. In an aspect, the notification may include the set of customization options. In another aspect, the application 140 may store all of the customization options available for an associated vehicle 102 and determine the applicable set of customization options based on the event identified in the notification. Further, the application 140 may store the user selected customization options in the memory 134. The application 140 may display output to the user interface 138 and receive input from the user interface 138. Additionally, the application 140 may communicate with external devices via the wireless interface 136. For example, the application 140 may directly communicate with the vehicle customization system 110 to receive notifications and send selected customization options. The application 140 may also communicate with the customization service 150 to relay information to the vehicle customization system 110.

The customization service 150 may be a remote service that provides customization for the vehicle 102. The customization service 150 may be a cloud service that is hosted by one or more servers or virtual servers. The customization service 150 may coordinate customization for one or more vehicles 102 and one or more wireless devices 130. For example, the customization service 150 may register a vehicle 102 based on a unique identifier such as a vehicle identification number (VIN) or an identifier of the communications interface 122. The customization service 150 may then associate the specific vehicle 102 with one or more wireless devices 130. In an aspect, the customization service 150 may perform an authentication procedure when registering a wireless device 130 to ensure that the wireless device 130 is authorized to set customization options for the vehicle 102. The customization service 150 may also store information regarding available customization options for each vehicle 102. For example, the customization service 150 may store a mapping of vehicle events to sets of customizable control options. When the customization service 150 receives a notification that an event has occurred at a vehicle 102, the customization service 150 may determine the corresponding set of customizable control options and the wireless device 130 associated with the vehicle 102. The customization service 150 may forward the notification with the set of customizable control options to the wireless device 130. The customization service 150 may also store descriptions, images, videos, or any other information associated with the customizable control options for download to the wireless device 130.

In operation, the vehicle customization system 110 may detect activation of a customizable control feature of the vehicle 102. A customizable control feature may include activation of any controller 118 that is associated with a set of customizable control options. For example, the ECU 112 may control a vehicle component to respond to the activation of the customizable control feature in multiple ways depending on selection of a customizable control option. In an aspect, when the vehicle 102 is new or the vehicle customization system 110 is reset, each of the customizable control features may be set to a default option. When the vehicle customization system 110 detects activation of a customizable control feature, the vehicle customization system 110 may send a notification to the wireless device 130. The notification may include the set of customizable control options associated with the activated control feature. The wireless device 130 may identify the activated control feature, the default option, and the set of customizable control options. The user of the wireless device 130 may select a desired customization option. The wireless device 130 may then send the selected customization option to the vehicle customization system 110. After the select customization option is received at the vehicle customization system 110, the ECU 112 may respond to future activations of the customizable control feature based on the selected customization option.

Figure 2A:
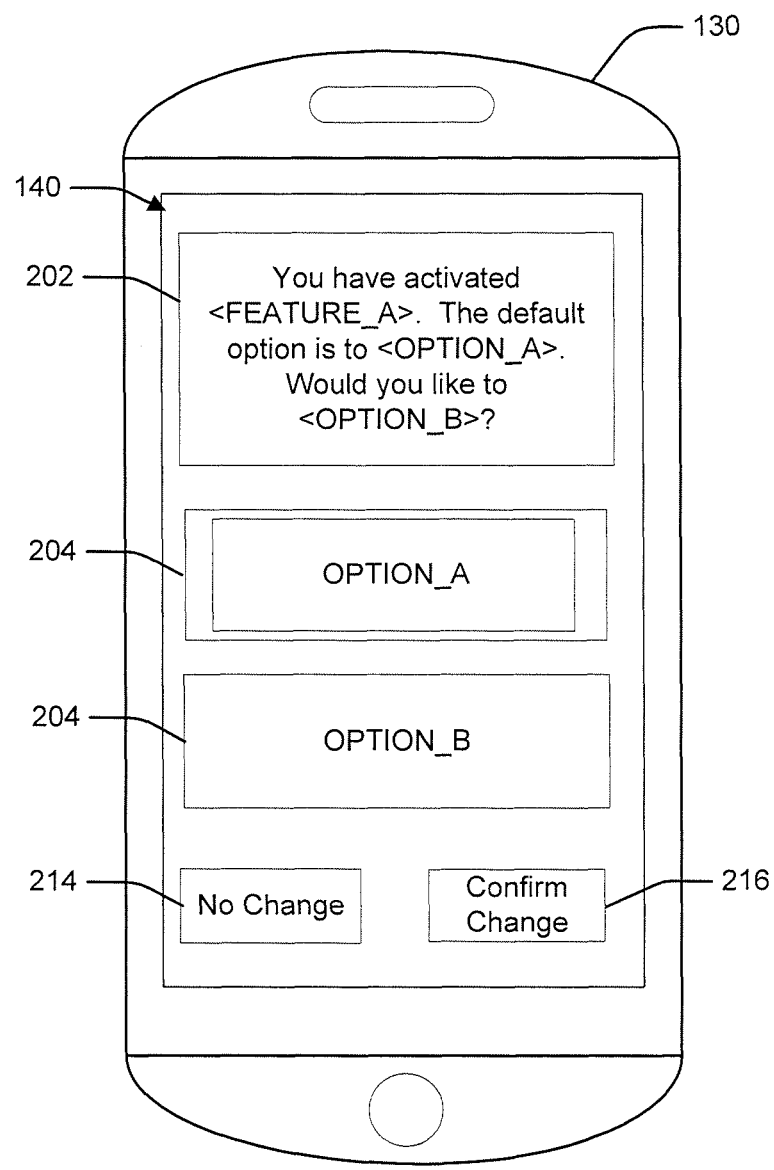
FIG. 2A illustrates an example of a vehicle customization notification on a wireless device.

FIG. 2A illustrates an example of a wireless device 130 providing a notification to a user. The wireless device 130 may provide the notification via the application 140. The application may be displayed on the user interface 138. In an aspect, the application may include a notification 202, control options 204, a cancellation option 214 and a confirmation button 216. The notification 202 may display information regarding a feature activation that has occurred recently. For example, the a notification may follow a template and include text such as "You have activated <FEATURE_A>. The default option is to <OPTION_A>. Would you like to <OPTION_B>?" The fields: <FEATURE_A>, <OPTION_A>, and <OPTION_B> may be replaced with information for the specific event. It should be appreciated that the notification may be presented in various manners. For example, the notification 202 may be presented audibly as a recorded message or text-to-voice. As another example, the notification 202 may include images, animations, or videos illustrating the feature activation.

The control options 204 may correspond to the set of customization options available for the activated feature. It should be apparent that the number and type of customization options 204 may vary based on the specific activated feature and available customization options. The control options 204 may be heightened to indicate the currently selected customization option or the default option. For example, a selected option may be highlighted, may change color(s), may add a border, or may change size. Each of the control options 204 may be a toggle-able button indicating whether the customization option should be performed in response to the feature activation. In an aspect, the application 140 may limit the number of selectable options based on the activation feature. For example, for unlocking doors, the application 140 may allow any combination of doors to be unlocked. In contrast, where the activated feature is associated with mutually exclusive choices, only a single customization option (e.g., On/Off) may be selected.

The cancellation option 214 may be used to indicate that no change in the customization options should occur. For example, the user may determine to keep using the default option. In an aspect, selection of the cancellation option 214 may prevent the vehicle customization system 110 from sending further notifications related to the activated feature.

The confirmation button 216 may be used to indicate that the user accepts the currently selected customization option. In response to the confirmation button 216 being selected, the application 140 may determine the selected customization option and send the selected customization option to the vehicle customization system 110. The application 140 may also store the selected customization option.

Figure 2B:
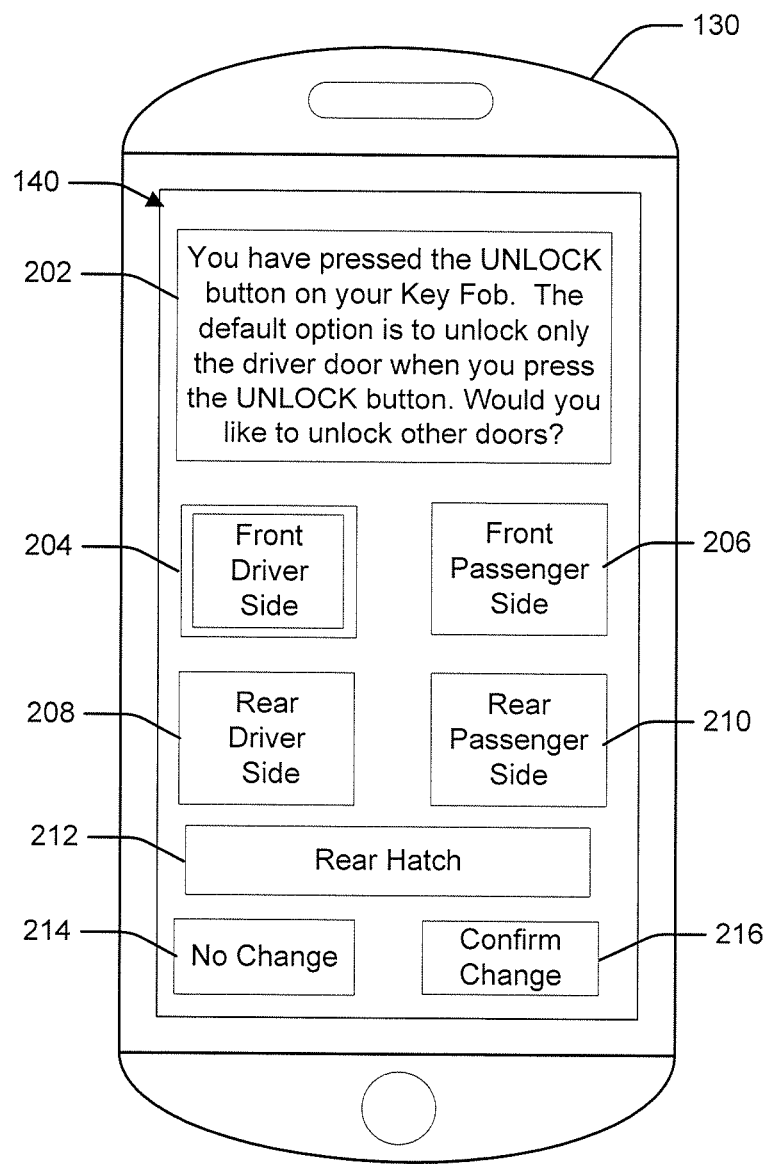
FIG. 2B illustrates another example of a vehicle customization notification on a wireless device.

FIG. 2B illustrates another view of the wireless device 130 providing a notification to a user. In this example, the application 140 may include a notification 202, control options 204, 206, 208, 210, 214, a cancellation option 214 and a confirmation button 216. The notification 202 may display information regarding a feature activation that has occurred recently. For example, the illustrated notification 202 may be in response to pressing an unlock button on a key fob and may include text such as, "You have pressed the UNLOCK button on your Key Fob. The default option is to unlock only the driver door when you press the UNLOCK button. Would you like to unlock other doors?" It should be appreciated that the notification may be presented in various manners. For example, the notification 202 may be presented audibly as a recorded message or text-to-voice. As another example, the notification 202 may include images, animations, or videos illustrating the feature activation.

Figure 3:
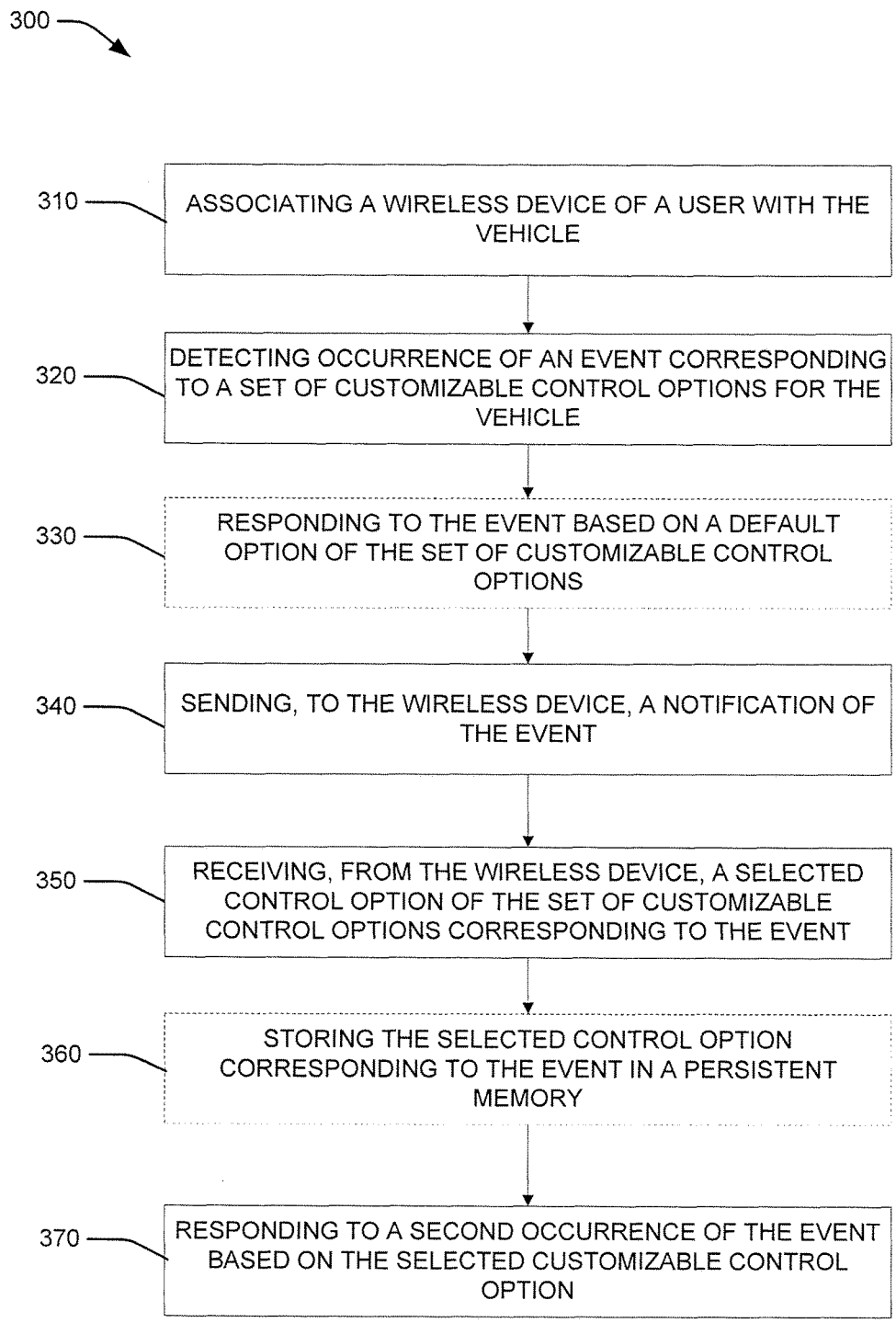
FIG. 3 illustrates a flowchart showing an example method for customizing a vehicle in accordance with aspects of the present disclosure.

The control options 204, 206, 208, 210, 212 may correspond to the set of customization options available for the activated feature of unlocking the door using the key fob. It should be apparent that the number and type of customization options may vary based on the specific activated feature and available customization options. In the illustrated example, the customization options correspond to the doors of the vehicle 102. Control option 204 is for the front driver side door, control option 206 is for the front passenger side door, control option 208 is for the rear driver side door, control option 210 is for the rear passenger side door, and customization option 212 is for the rear hatch or trunk. Accordingly, the customization options may be tailored for a specific feature. In another example, a customization feature may have a scalable value such as volume level. A control option 204 may be presented as a slider, selected value, or other graphical user interface element for selecting a value within a range. FIG. 3 illustrates a flowchart of an example method 300 for customizing a vehicle configuration. The method 300 may be performed by a vehicle customization system 110 within a vehicle 102.

In block 310, the method 300 may include associating a wireless device of a user with the vehicle. In an aspect, for example, the communications interface 122 may associate a wireless device 130 of a user with the vehicle 102. In an aspect, associating the wireless device 130 with the vehicle 102 may include establishing a direct communication link with the wireless device 130. For example, the communications interface 122 may establish a WLAN and the wireless device 130 may join the WLAN. As another example, the communications interface 122 may pair (e.g., using Bluetooth pairing) with the wireless device 130. In another aspect, associating the wireless device with the vehicle may include registering the vehicle 102 and the wireless device 130 with the customization service 150. In an aspect, associating the wireless device 130 with the vehicle 102 may include authenticating the wireless device 130 using a key fob associated with the vehicle 102. For example, the key fob may provide an authentication signal or unique identifier while establishing the direct connection between the vehicle 102 and the wireless device 130 or while registering the wireless device 130 with the customization service 150.

In block 320, the method 300 may include detecting a first occurrence of an event corresponding to a set of customizable control options for the vehicle. In an aspect, for example, the controllers 118 and/or the ECU 112 may detect the first occurrence of the event corresponding to the set of customizable control options for the vehicle 102. For example, a controller 118 may generate a signal when activated by the driver of the vehicle 102. The ECU 112 may receive the signal generated by the controller 118 and determine that a feature has been activated. The ECU 112 and/or the processor 114 may then determine whether the activated feature is associated with one or more sets of customizable control options. Further, the ECU 112 and/or the processor 114 may determine whether a customizable control option has been selected for the activated feature. For example, if the default option is set for the customizable control option, the ECU 112 and/or the processor 114 may determine that the activation of the controller 118 is a first occurrence of the event corresponding to the set of customizable control options for the vehicle. In contrast, if a non-default control option has been selected, the ECU 112 and/or processor 114 may determine that the signal corresponds to a subsequent occurrence of the event. In another aspect, each customizable feature may be associated with a flag or counter indicating whether the feature has been previously activated.

In block 330, the method 300 may optionally include responding to the event based on a default option of the set of customizable control options. In an aspect, for example, the ECU 112 may control another vehicle component to respond to the event based on the default option of the set of customizable control options. In the case of the first occurrence of the event, the default option may be used. Accordingly, the vehicle 102 may immediately respond to the activation of the feature. The user does not need to select an option in order for the vehicle 102 to respond to activation of the controller 118. Therefore, the user may learn a basic operation of the controller 118 when using it for a first time.

In block 340, the method 300 may include sending, to the wireless device, a notification of the event. In an aspect, for example, the communications interface 122 may send to the wireless device 130, a notification of the event. The notification may identify the event and/or a set of customizable control options associated with the event. In an aspect, the notification may be sent directly to the wireless device 130 using a relatively short range wireless communication technology such as Bluetooth, NFC, or WLAN. In another aspect, the notification may be provided via the customization service 150 using, for example, a WWAN. For example, the vehicle 102 may transmit a first notification to the customization service 150 using the communications interface 122. The first notification may include just an identifier of the event. The customization service 150 may then determine a set of customizable control options corresponding to the event for the vehicle 102. The customization service 150 may also determine the wireless device 130 corresponding to the vehicle 102 and various properties of the wireless device 130 such as application version, notification preferences, and security parameters. The customization service 150 may then generate a second notification including the set of customizable control options to send to the wireless device 130. In another aspect, the application 140 on the wireless device 130 may determine the set of customizable control options based on an identifier of the event received in a notification.

In block 350, the method 300 may include receiving, from the wireless device, a selected control option of the set of customizable control options corresponding to the event. In an aspect, for example, the communications interface 122 may receive, from the wireless device 130, a selected control option of the set of customizable control options corresponding to the event. In an aspect, the selected control option may include one or more actions to be performed in response to the event. The selected control option may be received by the communications interface 122 either directly from the wireless device 130 or indirectly via the customization service 150. In an aspect, the selected option is received using the same method used to send the notification of the set of customizable control options.

In block 360, the method 300 may optionally include storing the selected control option corresponding to the event in a persistent memory. In an aspect, for example, the memory 116 may be a persistent memory that stores the selected control option in association with the event. The memory 116 may also store the selected control option in association with the wireless device 130 so that the selected control option can be associated with a particular user (e.g., the user of the wireless device 130). Accordingly, different users may each store selected control options to customize the vehicle when the respective user is driving. The users or wireless devices 130 may also be prioritized so that a user or device may be selected when there are multiple devices or users in the vehicle 102.

In block 370, the method 300 may include responding to a second occurrence of the event based on the selected customizable control option. In an aspect, for example, the ECU 112 may respond to a second occurrence of the event based on the selected customizable control option. The ECU 112 may detect the second occurrence of the event by receiving a signal generated by the controller 118 and determining that a feature has been activated. The ECU 112 and/or the processor 114 may determine that the occurrence of the event is a second occurrence of the event based on the presence of a stored selected customization option in the memory 116. The ECU 112 may respond by controlling one or more vehicle components associated with the event based on the selected customization option. In an aspect, the ECU 112 may respond using a selected customization option corresponding to a wireless device detected within the vehicle 102. For example, the communications interface 122 may determine whether a connection to the wireless device 130 can be established when the vehicle starts or during operation of the vehicle. If the wireless device 130 is present, the ECU 112 may respond based on a selected customization option stored in association with the wireless device 130. If the wireless device 130 is not present, the ECU 112 may respond based on a selected customization option for a highest priority user or device.

Figure 4:
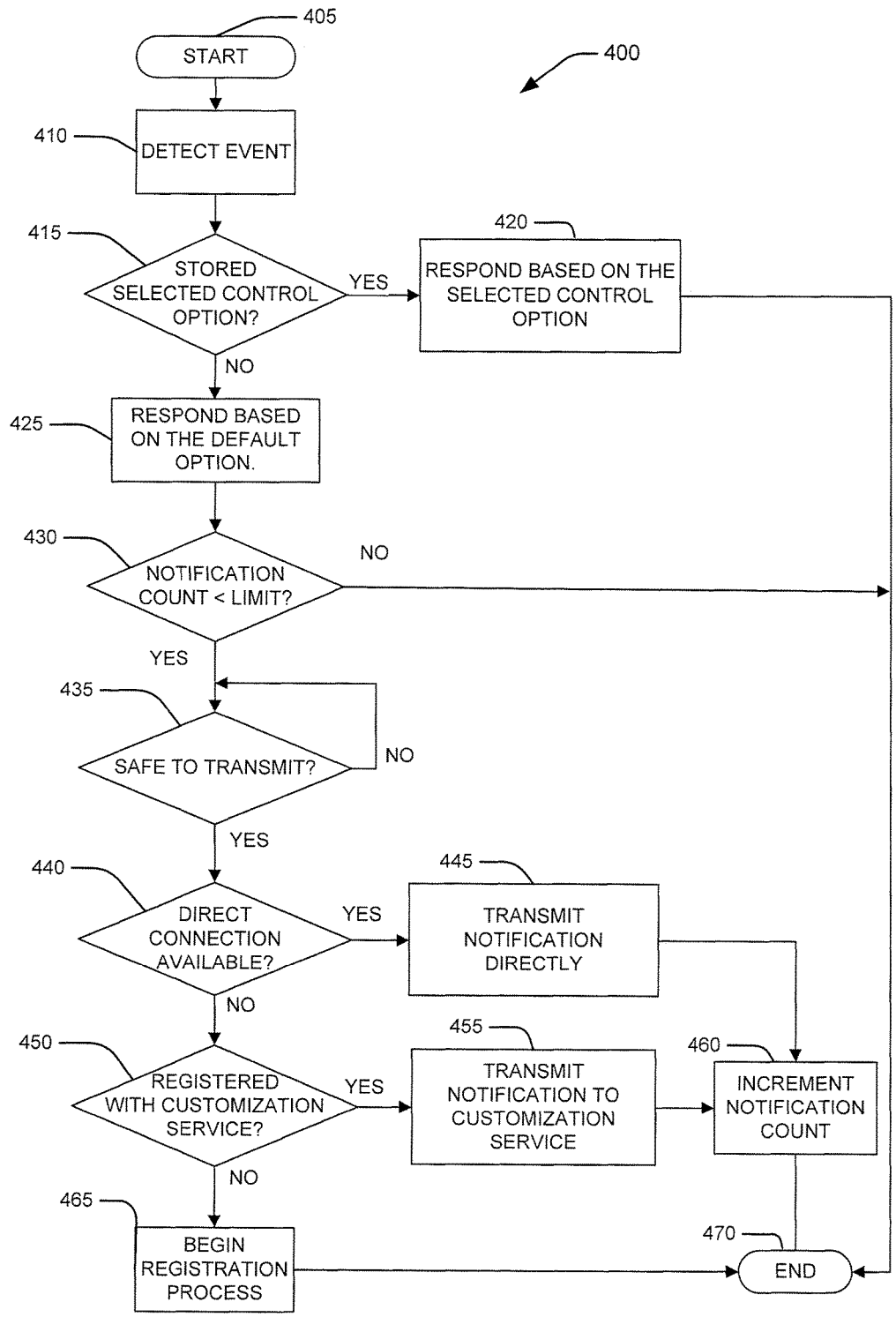
FIG. 4 illustrates a flowchart showing an example method of sending a customization notification in accordance with aspects of the present disclosure.

FIG. 4 illustrates a flowchart of an example method 400 for transmitting a notification. The method 400 may be performed by a vehicle customization system 110 within a vehicle 102. The method 400 may start at block 405.

At block 410, the method 400 may include detecting an event. As discussed above with respect to block 320 of FIG. 3, the ECU 112 may detect an event in response to activation of a controller 118 by a user of the vehicle 102. At block 415, the ECU 112 and/or processor 114 may determine whether a selected customization option is stored in association with the detected event. If a selected customization option is stored in association with the detected event, the method 400 may proceed to block 420 where the ECU 112 may respond to the event based on the selected control option. The method 400 may proceed from block 420 to block 465, where the method 400 ends.

If no selected control option is stored in association with the detected event, the method 400 may proceed to block 425, where the ECU 112 may respond based on the default option. In block 430, the method 400 may include determining whether a notification count is less than a limit. In an aspect, the notification count association with each event may be initialized to zero (0) whenever the vehicle customization system 110 is reset. The limit may prevent the vehicle customization system 110 from annoying a user by sending repeated notification regarding a customization option that the user is uninterested in setting. If the notification count is not less than the limit, the method 400 may proceed to block 465, where the method ends. If the notification count is less than the limit, the method 400 may proceed to block 435.

In block 435, the method 400 may include determining whether it is safe to transmit a notification. For example, the processor 114 may evaluate a set of rules to determine whether transmitting a notification is safe. The processor 114 may determine that it is safe to transmit a notification when the vehicle 102 is not moving. In another aspect, the processor 114 may determine that it is safe to transmit a notification only when the vehicle 102 is turned off. If it is not safe to transmit a notification, the method 400 may wait until it becomes safe. In an aspect, the method 400 may return to block 410 and detect additional events while it is unsafe to transmit a notification. Multiple notifications may be transmitted when it becomes safe. For example, the wireless device 130 may receive a group of notifications related to events that occurred during a trip when the vehicle is turned off. The method 400 may proceed to block 440 when it is safe to transmit.

In block 440, the method 400 may include determining whether a direct connection is available between the vehicle customization system 110 and a user device. For example, the communications interface 122 may determine whether a wireless device 130 is currently paired with the vehicle 102 or has joined a WLAN hosted by the vehicle 102, or otherwise established a direct communication channel. If a direct connection is available, the method may proceed to block 445, where the communications interface 122 may directly transmit a notification regarding the set of customizable control options corresponding to the event to the wireless device 130. If a direct connection is not available, the method 400 may proceed to block 450.

In block 450, the method 400 may include determining whether the vehicle 102 is registered with a customization service 150. For example, the memory 116 may store registration information for the customization service 150. If the vehicle 102 is not registered with the customization service 150, the method 400 may proceed to block 460. If the vehicle 102 is registered with the customization service 150, the method 400 may proceed to block 450, where the vehicle 102 may transmit a notification regarding the set of customizable control options corresponding to the event to the customization service 150. For example, the communications interface 122 may transmit the notification via a WWAN.

In block 460, in response to transmitting a notification in either block 440 or block 450, the method 400 may include incrementing the notification count associated with the detected event. Accordingly, the notification count may include the total number of notification sent regardless of whether the notifications are sent via a direct connection or the customization service 150.

In block 465, the method 400 may include beginning a registration process. The communications interface 122 may establish a connection with the customization service 150 using a WWAN. The user of the vehicle 102 may be asked to enter or confirm registration information via the user interface 120. The user interface 120 may also provide information for the user to register a wireless device 130 with the customization service.

Several examples of customizable features were provided in the above description. It should be appreciated that modern vehicles may include numerous features. The above described system and methods may be applied to any customizable feature available in a vehicle. Additional examples of such features are provided in Table 1, below. The "Feature" may identify and/or describe the feature of the vehicle 102 associated with customizable control options. The "Trigger" may identify an event that causes the vehicle customization system 110 to send a notification at the time of the event or when the vehicle is turned off following the event. The trigger, "Feature Activation," may indicate that the notification is sent when the feature is activated based on feature control. The "Options" may include a default option and other selectable customized control options.

TABLE 1

| Feature | Trigger | Options |
| --- | --- | --- |
| Forward Collision Warning Distance | Feature Activation | 1) Normal<br>2) Long<br>3) Short |
| ACC Forward Vehicle Detect Beep | Feature Activation | 1) On<br>2) Off |
| Road Departure Mitigation Setting | Feature Activation | 1) Normal<br>2) Wide<br>3) Warning Only |
| Lane Keeping Assist Suspend Beep | Feature Activation | 1) On<br>2) Off |
| Blind Spot Info | Feature Activation | 1) Audible and Visual<br>2) Visual Only<br>3) Off |
| Adjust Outside Temp Display | Temperature Setting Change | Scalable: ±5° |
| Trip Meter Reset Timing | Vehicle Refueled | 1) Refueled<br>2) IGN Off<br>3) Manual Reset |
| Reverse Alert Tone | Shift gear position to reverse | 1) On<br>2) Off |
| Auto Engine Idle Stop Guidance | Feature Activation | 1) On<br>2) Off |
| Turn by Turn display | Activation of route guidance | 1) On<br>2) Off |
| Easy Entry/Exit | Door open/close followed by seat adjustment | 1) On<br>2) Off |
| Memory Position Link | Pressing seat memory button | 1) On<br>2) Off |
| Door Unlock Mode | Pulling driver handle | 1) Driver Only<br>2) All Doors |
| Keyless Access Flash | Keyless access | 1) On<br>2) Off |
| Keyless Access Beep | Keyless access | 1) On<br>2) Off |
| Remote Start System ON/OFF | Feature Activation | 1) One<br>2) Off |
| Walk Away Auto Lock | Door Locked by key fob or smart door handle when vehicle off. | 1) On<br>2) Off |
| Interior Light Dimming Time | Driver Door Closed | 1) 60 Sec<br>2) 30 Sec<br>3) 15 Sec |
| Headlight Auto Off Timer | Driver Door Closed | 1) 60 Sec<br>2) 30 Sec<br>3) 15 Sec<br>4) 0 Sec |
| Auto Interior Illumination Sensitivity | Setting Headlight switch to AUTO | 1) Min<br>2) Low<br>3) Mid<br>4) High<br>5) Max |
| Auto Headlight On with Wiper On | Wiper Activation | 1) On<br>2) Off |
| Auto Light Sensitivity | Setting Headlight switch to AUTO | 1) Max<br>2) High<br>3) Mid<br>4) Low<br>5) Min |
| Auto Door Lock | Feature Activation | 1) Vehicle Speed<br>2) Shift from park<br>3) Off |
| Auto Door Unlock | Feature Activation | 1) All Doors with Driver Door<br>2) All Doors when shift to Park<br>3) All doors with Ignition Off<br>4) Off |
| Key And Remote Unlock Mode | Feature Activation | 1) Driver Door<br>2) All doors |
| Keyless Lock Answer Back | Feature Activation | 1) On<br>2) Off |
| Security Relock Timer | Feature Activation | 1) 90 sec<br>2) 60 Sec<br>3) 30 Sec |
| Power Tailgate Keyless Open Mode | Feature Activation | 1) Anytime<br>2) When Unlocked |
| Power Tailgate Open by Outer Handle | Feature Activation | 1) On<br>2) Off |
| Audio Source Pop-Up | Press Audio Button | 1) On<br>2) Off |
| Input Source Cover Art | Connection to input source | 1) On<br>2) Off |
| HD Radio Mode | Poor radio reception detected | 1) Auto<br>2) Analog |
| RDS Info | Feature Activation | 1) On<br>2) Off |
| Tune Start | Station Change | 1) On<br>2) Off |
| SportsFlash Setup | Tune to satellite sports channel | 1) Off<br>2) One Time On<br>3) On |
| Traffic and Weather Setup | Change of Regions | Available Regions |
| DVD/BD Auto Play | Feature Activation | 1) On<br>2) Off |

TABLE 1-continued

| Feature | Trigger | Options |
| --- | --- | --- |
| Audio Language | DVD/BD Activation | Available Languages |
| Subtitle Language | DVD/BD Activation | Available Languages |
| Menu Language | DVD/BD Activation | Available Languages |
| Angle Mark | Feature Activation | 1) On<br>2) Off |
| Dynamic Range | Activation of Dolby Digital audio | 1) On<br>2) Off |
| Ring Tone | Incoming Call | 1) Fixed<br>2) Mobile Phone |
| Text/Email | Feature Activation | 1) On<br>2) Off |
| New Message Notification | Feature Activation | 1) On<br>2) Off |
| Fixed Guidelines | Rear Camera Activation | 1) On<br>2) Off |
| Dynamic Guidelines | Rear Camera Activation | 1) On<br>2) Off |
| Lanewatch Show with Turn Signal | Feature Activation | 1) On<br>2) Off |
| Lanewatch display time after turn signal off | Feature Activation | 1) 0 Sec<br>2) 2 Sec |
| Lanewatch Reference Line | Feature Activation | 1) On<br>2) Off |
| Cross Traffic Monitor | Feature Activation | 1) On<br>2) Off |
| Auto Speaker | Adjust volume of rear speaker | 1) On<br>2) Off |
| Rear Control | Feature Activation | 1) On<br>2) Off |

Figure 5:
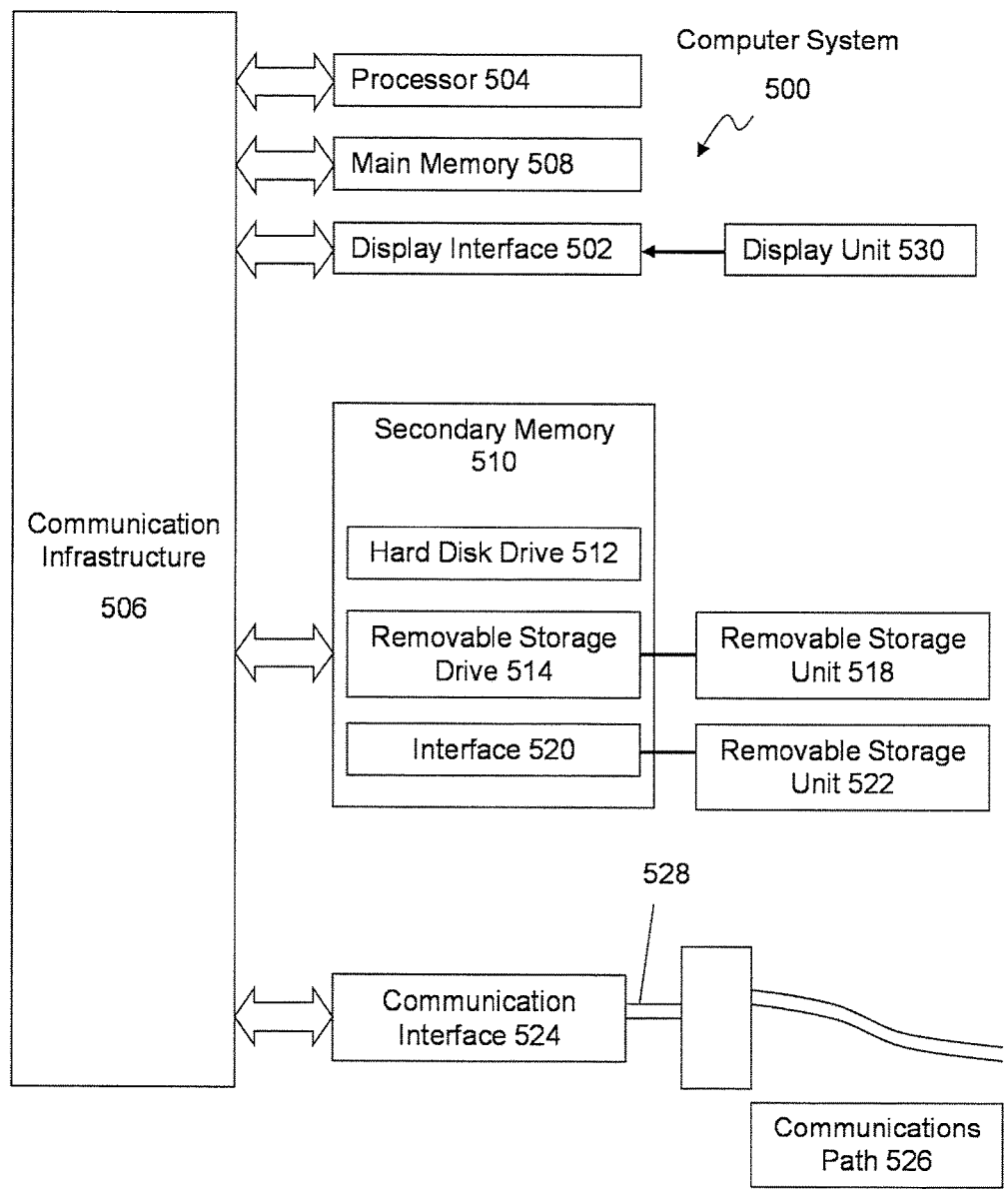
FIG. 5 presents an example system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 5 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 500 may include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and a communications interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and communications interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 580, a hard disk installed in hard disk drive 570, and signals 528. These computer program products provide software to the computer system 500. Aspects of the disclosure are directed to such computer program products.

Computer programs (also referred to as computer control logic) are stored in main memory 508 and/or secondary memory 510. Computer programs may also be received via communications interface 524. Such computer programs, when executed, enable the computer system 500 to perform various features in accordance with aspects of the present disclosure, as discussed herein. In particular, the computer programs, when executed, enable the processor 504 to perform such features. Accordingly, such computer programs represent controllers of the computer system 500.

In variations where aspects of the disclosure are implemented using software, the software may be stored in a computer program product and loaded into computer system 500 using removable storage drive 514, hard disk drive 512, or communications interface 520. The control logic (software), when executed by the processor 504, causes the processor 504 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 6:
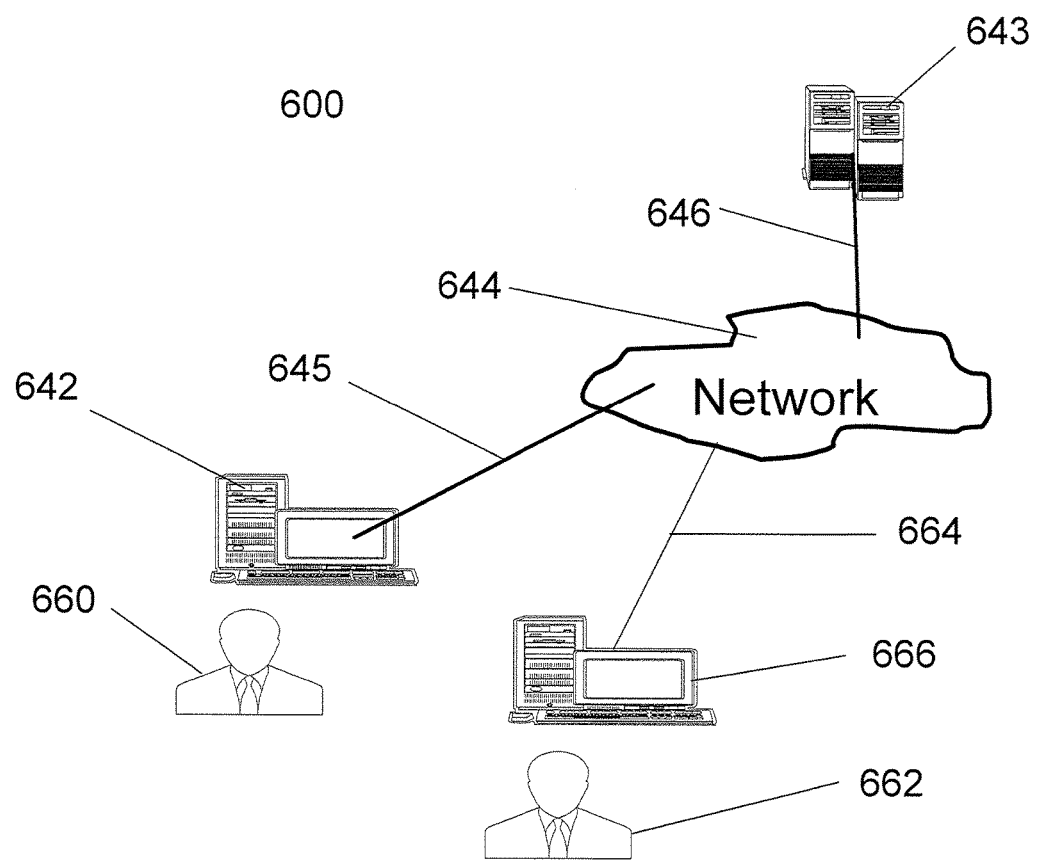
FIG. 6 is a block diagram of various example system components for use in accordance with aspects of the present disclosure.

FIG. 6 is a block diagram of various example system components that may be used in accordance with aspects of the present disclosure. For example, the various components may be within the vehicle 102, or only some of the components may be within the vehicle 102, and other components may be remote from the vehicle 102. The system 600 includes one or more accessors 660, 662 (also referred to interchangeably herein as one or more "users") and one or more terminals 642, 666 (such terminals may be or include, for example, various features of the vehicle customization system 110 or wireless device 130). In one aspect, data for use in accordance with aspects of the present disclosure is, for example, input and/or accessed by accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of customizing a configuration of a vehicle, comprising:
    associating a wireless device of a user with the vehicle;
    detecting a first occurrence of an event corresponding to a set of customizable control options for the vehicle;
    sending, to the wireless device, a notification of the event;
    receiving, from the wireless device, a selected control option of the set of customizable control options corresponding to the event; and
    responding to a second occurrence of the event based on the selected control option.

2. The method of claim 1, further comprising storing the selected control option corresponding to the event in a persistent memory.

3. The method of claim 2, wherein storing the selected control option comprises storing the selected control option in association with an identifier of the wireless device, wherein responding to the second occurrence of the event based on the selected control option comprises detecting a presence of the wireless device within a proximity of the vehicle and responding to the second occurrence of the event based on the selected control option stored in association with the identifier of the wireless device in response to detecting the presence of the wireless device within the proximity of the vehicle.

4. The method of claim 1, wherein associating the wireless device of the user with the vehicle comprises authenticating the wireless device using a key fob associated with the vehicle.

5. The method of claim 1, wherein detecting the first occurrence of the event comprises detecting that a controller of the vehicle has been activated by the user, the method further comprising responding to the first occurrence of the event based on a default option of the set of customizable control options.

6. The method of claim 5, wherein the event is an activation of a lock controller, the responding to the first occurrence of the event includes unlocking a driver door, and the notification includes options for unlocking other doors in addition to the driver door.

7. The method of claim 1, further comprising determining whether the vehicle is stopped, wherein sending the notification is in response to determining that the vehicle is stopped.

8. The method of claim 1, wherein sending the notification comprises wirelessly transmitting the notification directly to the wireless device via a short-range wireless protocol.

9. The method of claim 1, wherein sending the notification to the wireless device comprises wirelessly transmitting the notification to the wireless device via a remote customization service, separate from the vehicle and the wireless device, that sends the notification to the wireless device.

10. A customizable vehicle configuration system, comprising:
    a plurality of vehicle controllers that are operable to control respective components of a vehicle;
    a wireless communications interface;
    a memory; and
    a processor communicatively coupled to the wireless communications interface and the memory, the processor configured to:
    associate a wireless device of a user with the vehicle;
    detect, from at least one of the plurality of vehicle controllers, a first occurrence of an event corresponding to a set of customizable control options for the vehicle;
    send, to the wireless device via the wireless communications interface, a notification of the event;
    receive, from the wireless device via the wireless communications interface, a selected control option of the set of customizable control options corresponding to the event; and
    respond to a second occurrence of the event based on the selected control option.

11. The customizable vehicle configuration system of claim 10, wherein the processor is further configured to store the selected control option corresponding to the event in the memory, wherein the memory is a persistent memory.

12. The customizable vehicle configuration system of claim 11, wherein the processor is configured to store the selected control option in association with an identifier of the wireless device, detect a presence of the wireless device within a proximity of the vehicle, and respond to the second occurrence of the event based on the selected control option stored in association with the identifier of the wireless device and the presence of the wireless device.

13. The customizable vehicle configuration system of claim 10, wherein the processor is configured to authenticate the wireless device using a key fob associated with the vehicle.

14. The customizable vehicle configuration system of claim 10, further comprising an electronic control unit configured to detect that one of the plurality of vehicle controllers has been activated by the user.

15. The customizable vehicle configuration system of claim 14, wherein the event is unlocking a driver door, and the notification includes options for unlocking other doors in addition to the driver door.

16. The customizable vehicle configuration system of claim 10, wherein the processor is configured to determine whether the vehicle is stopped and send the notification is in response to determining that the vehicle is stopped.

17. The customizable vehicle configuration system of claim 10, wherein the wireless communications interface is configured to transmit the notification directly to the wireless device via a short-range wireless protocol.

18. The customizable vehicle configuration system of claim 10, wherein the wireless communications interface is configured to transmit the notification to a remote customization service, separate from the vehicle and the wireless device that sends the notification to the wireless device.

19. The customizable vehicle configuration system of claim 10, wherein the processor is configured to respond to the first occurrence of the event based on a default option of the set of customizable control options.

20. A non-transitory computer readable medium storing computer executable instructions for customizing a configuration of a vehicle, comprising instructions to:
associate a wireless device of a user with the vehicle;
detect a first occurrence of an event corresponding to a set of customizable control options for the vehicle;
respond to the first occurrence of the event based on a default option of the set of customizable control options;
send, to the wireless device, a notification of the event;
receive, from the wireless device, a selected control option of the set of customizable control options corresponding to the event; and
respond to a second occurrence of the event based on the selected control option.

* * * * *